May 10, 1949.　　　　J. R. BOWMAN　　　　2,469,627
CALCULATING MACHINE FOR SOLVING
SIMULTANEOUS EQUATIONS

Filed March 19, 1943　　　　　　　　　　5 Sheets-Sheet 1

Inventor

John R. Bowman

By [signature]
His Attorney

RESPONSE OF CURRENT SUPPLY UNIT

REGULATION OF CURRENT SUPPLY UNIT

Inventor
John R. Bowman
By [signature]
his Attorney

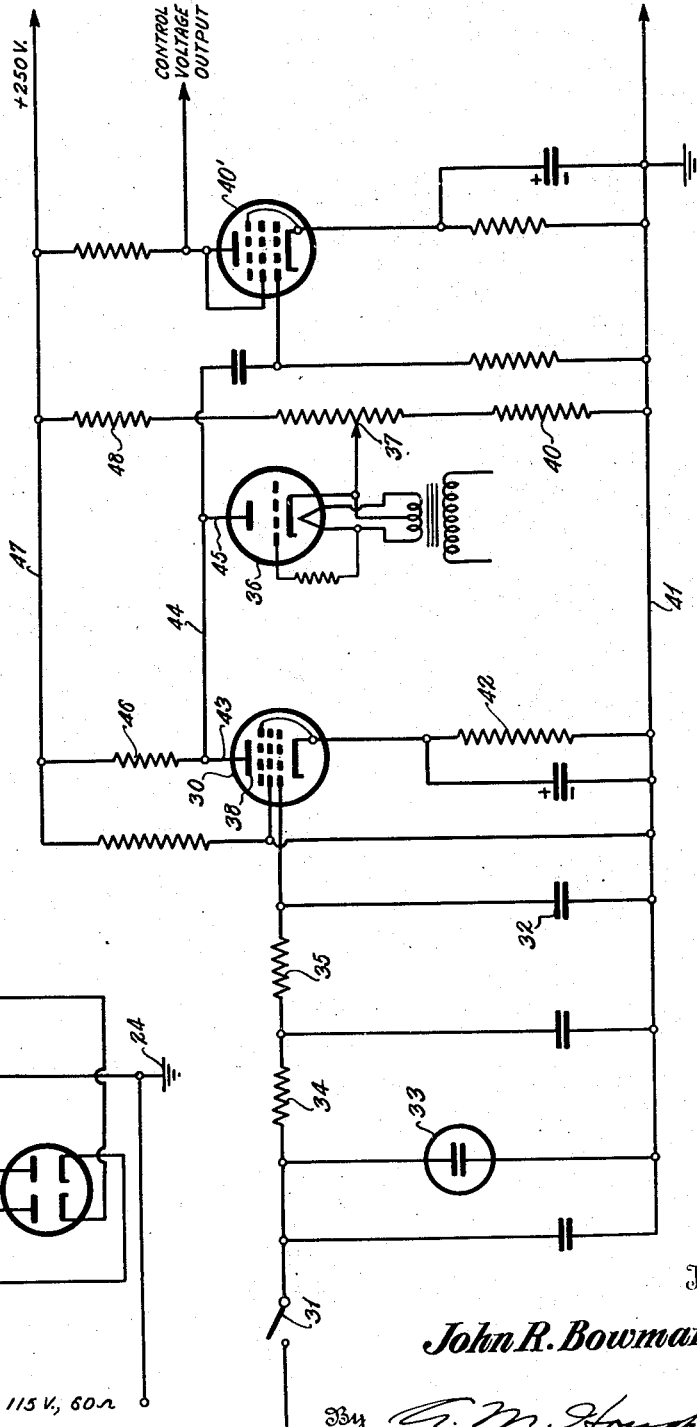
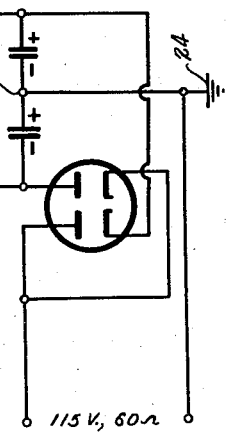

May 10, 1949.  J. R. BOWMAN  2,469,627
CALCULATING MACHINE FOR SOLVING
SIMULTANEOUS EQUATIONS
Filed March 19, 1943  5 Sheets-Sheet 4

RESPONSE OF AMPLIFIER UNIT

Inventor
John R. Bowman
By G. M. Houghton
his Attorney

May 10, 1949.  J. R. BOWMAN  2,469,627
CALCULATING MACHINE FOR SOLVING
SIMULTANEOUS EQUATIONS
Filed March 19, 1943  5 Sheets-Sheet 5

Inventor
John R. Bowman

Patented May 10, 1949

2,469,627

UNITED STATES PATENT OFFICE 2,469,627

CALCULATING MACHINE FOR SOLVING SIMULTANEOUS EQUATIONS

John R. Bowman, Pittsburgh, Pa., assignor to Gulf Research & Development Company, Pittsburgh, Pa., a corporation of Delaware Application March 19, 1943, Serial No. 479,790

2 Claims. (Cl. 235—61)

This invention relates to calculating machines and more particularly to electronic calculating machines adapted for use in the solution of linear simultaneous algebraic equations.

Solution of systems of linear algebraic equations is, of course, one of the most common operations of computation. Elementary methods of elimination or substitution are quite satisfactory for systems having not more than four variables. For larger systems, however, the calculations become extremely laborious, as the number of arithmetical operations required increases approximately as $n.n'$ for $n$ variables; exact solution of a system of 20 variables requires more than $10^{20}$ operations. Many years ago Gauss pointed out that any problem in computation can, theoretically, be reduced to solution of a linear system of equations which fact has subsequently from a practical standpoint been accepted as true. For large systems, except those with many terms missing, the simplest straightforward method available is that of Sylvester employing determinants, which is not readily adapted to a conventional keyboard calculating machine. Practically, systems of greater than five variables are nearly always solved by methods of successive approximations. These approximate methods are also laborious, and frequently do not give good accuracy; they are discussed at some length later. The numerical solution of such systems of equations thus presents a problem requiring a special type of calculating machine.

Apparently, no wholly successful machine of this type, capable of handling large systems of equations has been constructed prior to this invention. This is believed to be the largest gap in the great array of calculating machines. Linear system problems occur in many, if not most, branches of pure and applied science and engineering, and there is at present no practical way of handling large ones. The applications of such a machine are so varied that it is impossible to give more than a very brief and sketchy list of them here.

Further, since in the past solution of large systems of simultaneous equations was difficult or impossible, little attention was paid to the reduction of problems to such systems; doubtless the availablity of a machine of the present type will stimulate interest in new transformations that will extend the use of the instrument beyond applications now obvious.

Several difficult mathematical operations are equivalent to solution of a linear algebraic system. One of these is the expansion of functions in series; with an $n$ variable device $n$ terms are readily determined. Harmonic analysis is a special case of this, and would provide an excellent justification for the machine alone. Numerous devices have been built specifically for harmonic analysis, some of them very elaborate and none as potentially accurate as this device. Other useful expansions are series of powers, exponentials, error functions, spherical harmonics and Bessel functions. These operations are the best way of analyzing and generalizing empirical functional forms, and they occur very frequently in pure and applied physics.

The present device is also capable of integrating ordinary linear differential equations. Here, the given equation is regarded as a finite difference equation with the increments very small; $n$ points of the integral are obtained on a single pass through the instrument, and any number of passes may be made using the last point of the last set as the boundary point for the next set. Good accuracy is obtainable, since the intervals between the points can be made very small without incurring laborious calculation.

Linear integral equations can likewise be solved numerically. Repeated use of the machine will again increase the accuracy of the solution, but not as satisfactorily as in the case of differential equations because the $n$ points selected for the independent variable must necessarily cover the entire range of integration rather uniformly. However, if $n$ is about 15 or greater sufficient accuracy will be obtained for nearly all practical work. The application of the present machine in this connection is essentially a finite case of the well known Fredholm process; a more refined approximation, depending on the reduction of the equation to a linear system has been described recently, in Crout, J. Math. Phys. Mass. Inst. Tech., 19, 34 (1940). These applications are of particular interest at present because of the active modern interest in integral equations in many branches of science and engineering.

Correlation of data by the method of least squares always involves the solution of linear algebraic systems. This is a particularly important application, and will appear in nearly every type of experimental numerical work from surveying to psychology.

Numerical solutions of linear systems are of importance in a few highly theoretical lines of endeavor; good examples are in group theory in pure mathematics and in the calculation of wave functions by the Hartree method in quantum mechanics.

Electrical networks furnish a great class of practical problems of such importance that several specialized machines, more or less equivalent to the present device, have been built. The mathematical statement of these problems is directly in the form of linear algebraic equations, arising from the application of Kirchoff's and Ohm's laws, and requires no reduction for solution by the present device.

Stress-strain problems in connection with structural units comprise an important division of mechanical and civil engineering. These lead, in the more complicated cases, to the determination of several unknowns in a linear system. Machines, dams, bridges, airplanes, and buildings are just a few examples of design problems where this device might help.

Step-wise countercurrent processes, as widely used in chemical engineering, are easily treated rigorously by the present type of machine. These include rectification, as in a bubble plate column, absorption, adsorption, extraction and chemical reaction processes.

Chemistry offers at least two general types of problems in which the device would be useful, equilibrium and kinetic calculations. The water-gas reaction is a good example of the first. Here, five components are mutually inter-convertible through four reactions; if the equilibrium constants are known, as they are in this case, the equilibrium compositions may be calculated at any temperature by solution of a linear algebraic system. The inverse problem is also readily treated; if the compositions are known, the equilibrium constants can generally be calculated, even for rather complex systems. Kinetic calculations are formally similar. In these problems, one has to deal with reaction rates, and if the reaction rate constants are known, the progress of the reactions in a complex system can be followed with this device. Gas-phase combustion is an example of this type of problem.

The immediate response of the present device, and the ease with which the co-efficients and constant terms may be adjusted permits its use for control work. Consider, for example, the use of the mass spectrograph as a gas analyzer for control of a still. Each component gives a spectrum of several peaks. The patterns for the different components are all different, but the peaks are more or less superposed. By selection of $n$ suitable peaks, the composition of the gas with respect to $n$ components may be obtained continuously, and used for indication, control, or recording. More generally, any mixture may be analyzed by measurement of $n$ independent physical properties, and if these properties are linear functions of the compositions, the device will give the analysis continuously. Density, refractive index, vapor pressure, optical activity, and absorption spectrum are a few of the properties that might be used.

Only a few machines for solving systems of linear equations have been built in the past. The earliest successful one is a six-variable instrument described by Mallock; R. R. M. Mallock, Pros. Roy. Soc., A140, 457 (1933); which depends on the A. C. flux in numerous small transformers having multiple coils. The principle of that machine is very simple, but the accuracy is poor, and becomes increasingly so as the number of variables is increased. Rather complicated compensating circuits are required to correct for the losses in the transformers. Mention is made in the original paper that the Cambridge Instrument Co. has built a machine of this type for ten variables, but no definite performance data are given for it.

The only other instrument designed strictly for the present application that has been fully described is that built at the Massachusetts Institute of Technology and described in detail by Wilbur, J. Franklin Inst., 222, 715 (1936). This is a mechanical type for nine variables, depending for action on simple geometrical properties of levers. The accuracy reported is good, but the machine is difficult to set for a problem and considerable time is required for indication of the solution. The cost of this type is great; many small pulleys, levers, ball-bearings, steel bands and micrometer screws are required, and the machine takes up a considerable amount of space.

A "network analyzer" has been built by Westinghouse and described by Travers and Parker in The Electric Journal, page 3 (May 1930). This is a machine specifically designed for solving problems in electrical networks by a process which practically amounts to setting up of scale models of the circuits and measuring their performance. It is not strictly equivalent to the proposed type of machine, in as much as each equation must have only a limited number of terms, though the number of variables may be large. Furthermore, it is not suitable for solving problems given in the usual algebraic form, because the discovery of the network corresponding to the given problem is not a straightforward operation. The Westinghouse machine is a very large one; its control boards fill three walls of a room about 20 x 20 feet, and have about 8000 switches, several plug boards with hundreds of jacks, and numerous other controls. The makers built the machine for their own research use, not for commercial production.

None of the machines described could feasibly be adapted to solution of systems as large as the proposed one will solve, and the proposed one is superior to all with respect to speed, accuracy, cost and size.

Therefore, the primary object of this invention resides in the provision of a flexible electronic calculating machine that is adapted for solving systems of linear algebraic equations which include those of the type mentioned above.

More specifically, it is the object of the present invention to provide an electronic machine for determining the roots of $n$ variables related by $n$ linear algebraic equations, where $n$ is any positive integer greater than unity, comprising $n^2$ modulated regulated direct current supplies and $n$ amplifiers giving an alternating current response to a direct current input, $n^2$ resistors adjustable to be proportional to the coefficients of the system of equations, $n$ sources of direct current voltage adjustable to be proportional to the constant terms of the system of equations, these circuit units being connected in $n$ circuits, each traceable from the voltage supply, through $n$ of the resistors in series and into the amplifier, each of the resistors being supplied with current from one and only one of the current supplies, and the output of the $m$-th amplifier, where $m$ runs from one to $n$, so connected as to modulate the $m$-th current supplies of all the said circuits, and at least one of the said circuits being provided with $n$ current measuring devices in series with its current supplies giving indications that can be read as roots of the system of equations.

Another object of this invention resides in the provision of electronic calculating machines which employ the principles of fully degenerative feed-back.

Still another object of this invention resides in the provision of an electronic calculating machine adapted for use in solving a system of $n$ simultaneous algebraic equations having $n$ variables which will indicate directly and continuously the roots thereof.

This invention further contemplates the provision of an electronic calculating machine for the solution of systems of algebraic equations that is small, compact, economical to manufacture, and easy to operate.

Other objects and advantages of the present invention will become apparent from the following detailed description when considered with the drawings which:

Figure 6 is a detailed wiring diagram illustrating the circuit for one of the $n$ constant term voltage supplies;

Figure 7 is a detailed circuit diagram of one of the $n$ amplifier units;

Figure 1:
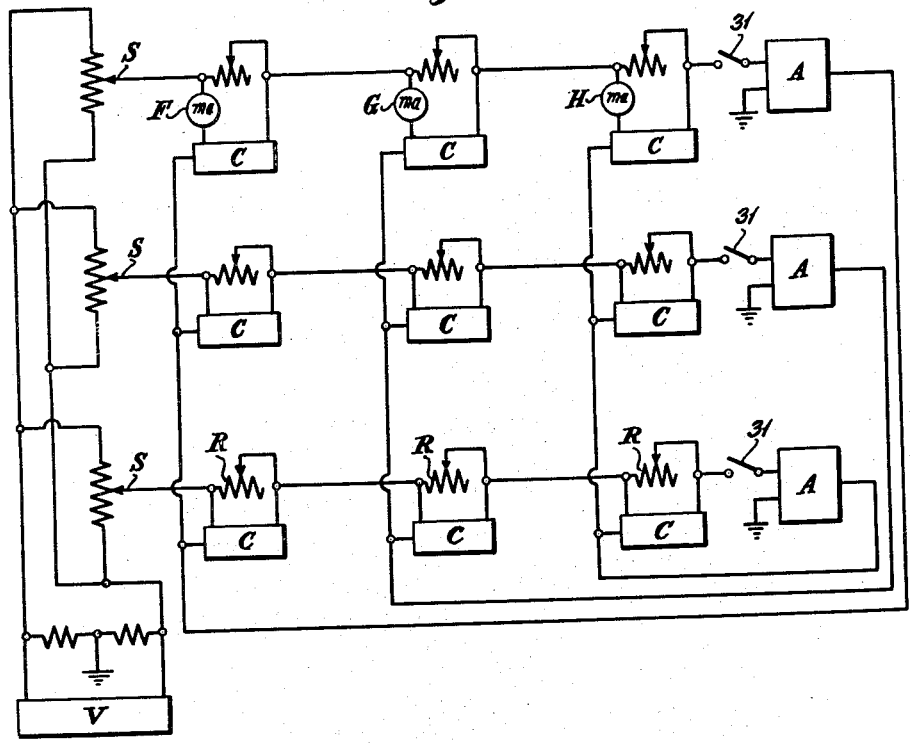
Figure 1 is a blocked diagram of a three-variable machine which serves to illustrate the present invention which is directed to an $n$ variable machine.

Referring to the drawings in detail, particularly Figure 1, there is illustrated diagrammatically a machine according to the present invention for the purpose of solving linear simultaneous equations of three variables. The three-variable instrument is, of course, of little value other than to illustrate the basic principles of the machine. Three variable systems are readily solved in a few minutes by ordinary arithmetical processes. A three-variable machine is illustrated merely to demonstrate the construction and operation of a larger one which would handle problems not amenable to other treatment.

By way of explanation of the principles involved in the present invention:

Let a problem be given in or reduced to, the form $$k_i - a_{ij}x_j = 0 \quad i, j = 1, 2 \ldots n$$

The proposed machine recognizes the constant terms ($k$'s) as voltages, the coefficients ($a$'s) as ohmic resistances, and the variables ($x$'s) as currents. Each equation is represented by a single circuit, beginning at a point on a voltage divider or potentiometer which may be voltage above or below ground, and having $n$ adjustable resistors in series. Each adjustable resistor is provided with an independent, floating, D. C. supply. These supplies will establish voltage drops across the adjustable resistors which are proportional to the $ax$ terms. These voltage drops, since they are in series, will add, algebraically, to the reference voltage corresponding to the constant term to produce a voltage at the end of the circuit proportional to the value of the left side of the equation. If now, the $n^2$ current supplies can be made to supply currents such that the $m$-th values are equal for $m$, and all of these latter voltages are zero, the system of equations is solved, and the roots may be read immediately by measurement of the currents.

Again referring to Figure 1, the current supplies are designed to give an output of direct current, the magnitude of which is dependent on that of an A. C. control voltage; all $n^2$ of them are identical. Since, when the given equations are reduced to the canonical form, the appearance of the variables in the $ax$ terms is such that one variable occurs alone in one column, and since the current outputs of the current supplies correspond to the variables, the outputs and hence the control voltages must be equal among all the supplies of any one column. Full degeneration is accomplished by causing the sum voltages of the $n$ equations to modulate the control voltages of the supplies by columns respectively. Obviously, this arrangement will correct an error in any diagonal $ax$ term. If the $x$ in that term is too large or small, a signal is communicated to the amplifier connected to that equation circuit, which generates a change in the control voltage output of that amplifier, and that control voltage change is applied directly to the current supply corresponding to that $x$ in a manner to correct its value. These current supplies actuate the meters F, G, and H which can be calibrated to read directly the roots of the three equations.

Figure 3:
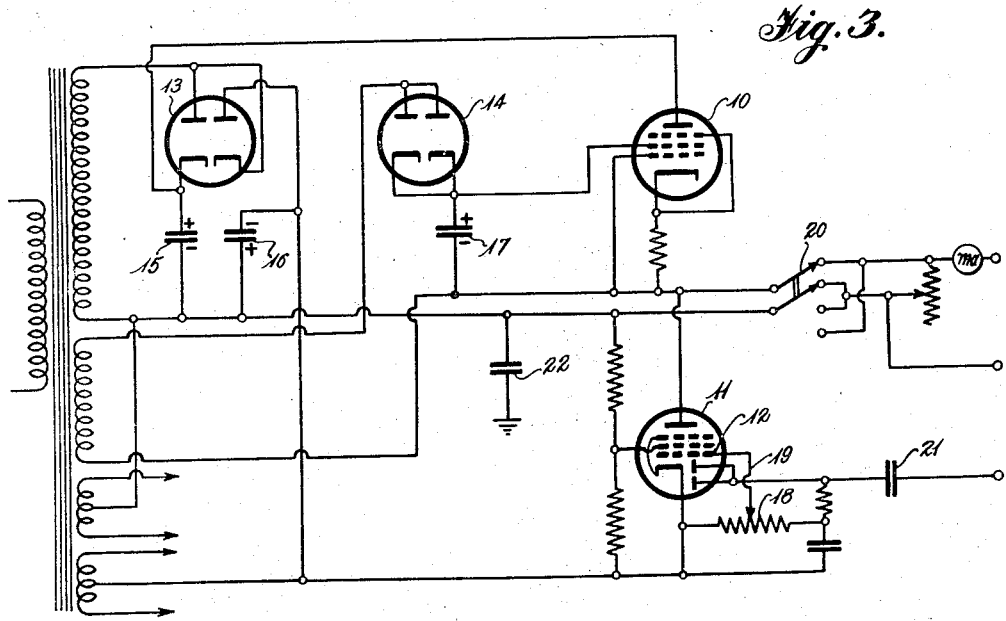
Figure 3 is a detailed wiring diagram of one of the $n^2$ current supply units of the type used in the novel machine forming the subject matter of this application.

Discussing the elements of the machine separately, reference is made to the current supply units C of Figure 1, one of which is shown in detail in Figure 3. These units depend for their action on the very high differential plate resistance of the pentode tubes 10 and 11. A resistor in the plate circuit of such a tube will pass a current that is nearly independent of the value of the resistance. The current, however, is readily controlled by the value of the bias on the control grid of the tube. In the current supply circuit two such tubes 10 and 11 are employed in such manner that the polarity of the current may be reversed electronically. The tube 10 of the 6J7 type, serves as a constant current supply, being set at a value of about 1 ma.; the tube 11 of the 6B8 type, acts as a controlled current supply, furnishing a current of from 0 to about 2 ma. of opposite polarity and controlled by a voltage applied to its first grid 12. The two pentode tubes 10 and 11 are so connected that the output can be taken as the algebraic sum of the two currents, so that the net action of the circuit is to furnish current at $+1$ to $-1$ ma. depending on the value of an A. C. control voltage, and nearly independent of the load resistor value.

Two separate power supplies 13 and 14 are necessary. Power supply 13 in the form of a 25Z6 tube, supplies plate voltage for the two pentodes 10 and 11 and screen voltage for the pentode 11. Power supply 14 in the form of a 6H6 tube, supplies screen voltage for the pentode 10. The former is a conventional doubler circuit, eliminating the need for a center-tapped bleeder for the return of the output. The latter is an ordinary half wave rectifier. Simple capacitance filtering is made possible by the condensers 15, 16 and 17 and is adequate in both cases. The pentodes, although their heaters are not shown, are provided with separate heater current supplies; this may not be necessary, but is recommended, since the two cathodes may at times differ in potential by as much as 600 volts. A separate supply is also provided to heat the main rectifier tube. This does not add to the complexity of the circuit, because the 25 volt supply is necessary for the screen of the tube 10.

The input circuit of the tube 11 is essentially that of a diode bias detector such as is widely used in radio practice. Its action is merely rectification of the applied A. C. signal and the application of the filtered D. C. to the control grid. The control potentiometer 18 is used in the grid circuit 19 of tube 11 to adjust the current supply to compensate for individual variations in tube and other circuit part characteristics. A single point of adjustment was found to be sufficient; the potentiometer was locked at a point such that the current output of the unit was zero for control voltage of 10 volts. This setting was found to be very stable and required readjustment only when tubes were interchanged.

The output is provided with a polarity reversing switch 20 for selecting the sign of the coefficient when a problem is put into the machine. As shown diagrammatically in Figure 1, meters F, G, and H are placed in the current supply unit output leads. Such a meter is illustrated in Figure 3 at 20'.

An important point is that the entire circuit for the unit is isolated from all D. C. potentials. All power is supplied through transformers, and the A. C. control voltage circuit, both input and ground return, is blocked with small condensers 21 and 22. The current output therefore floats, and may assume any absolute D. C. potential required. In practice, this may reach 900 volts when a three-variable instrument is unbalanced, or 300 volts when it is balanced.

Figure 4:
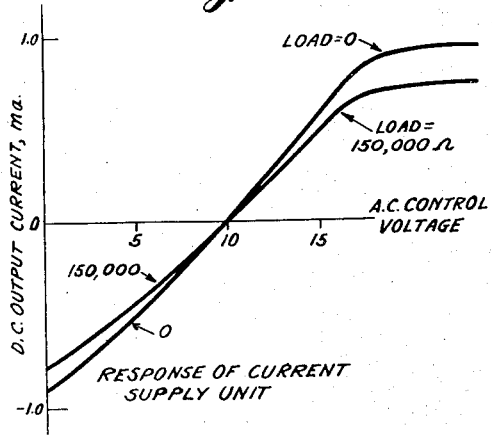
Figure 4 is a system of curves which have been plotted with direct current output as ordinates and alternating current control voltage as abscissae representing the response of each of the current supply units.
Figure 5:
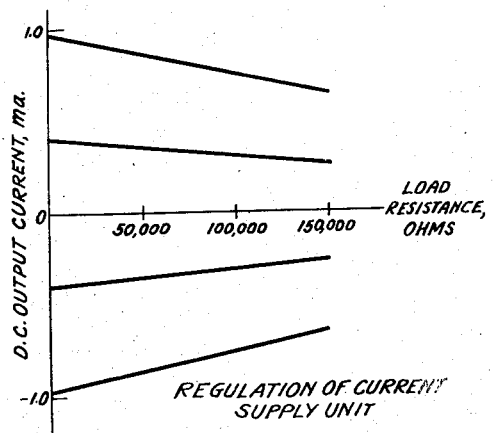
Figure 5 is a system of curves which have been plotted with direct current output as ordinates and load resistance as abscissae which represent the regulation of a current supply unit.

Response curves that have been plotted with output current vs. A. C. control voltage are illustrated in Figure 4 for extreme values of load. In Figure 5 are presented data showing the dependence of output current on the value of the load resistance at several control voltages.

The constant term voltage supply shown diagrammatically in Figure 1, is illustrated in Figure 6 and requires little description. A standard full wave doubler circuit is used which employs a type 117Z6 rectifier tube. The mid-point 23 of the doubler circuit is grounded at 24. The voltage dividers therefore yield outputs of −150 to +150 volts, on a linear scale, when a 60-cycle power supply of 115 volts is used. This unit is the only one of the entire circuit that is sensitive to line voltage fluctuation. A change in line voltage will effect the indicated roots by a proportional change in the constant terms. Therefore, for a precision instrument, these voltages must be stabilized.

Figure 2:
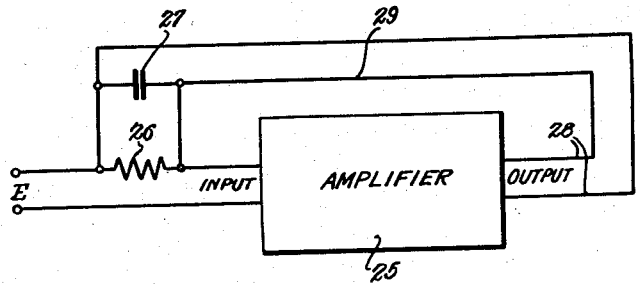
Figure 2 is a diagrammatic illustration of an amplifier illustrating the principles of fully degenerative feed-back in its simplest form.

The amplifiers used in this machine are of the fully degenerative type which make use of the principles of negative feed-back. The manner in which these amplifiers cooperate with the current supplies to yield the proper currents is by the use of degeneration or negative feed-back. This is best explained by consideration of the simplest circuit of that type, essentially one for the solution of a single equation with a single unknown. That circuit is illustrated in Figure 2. An amplifier 25 is used which has a large input resistance, a large voltage gain, and a floating output. Ignoring the condenser 27 for the present, when a voltage is applied to the point E, the amplifier 25 initially functions to give a larger voltage across its output 28. This voltage is applied by means of the conductors 29 across a resistor 26 in series with the input of the amplifier 25 with polarity such that it tends to buck out the input voltage initially applied at the point E. The equilibrium position of the circuit is readily calculated quantitatively. The fundamental performance of the amplifier may be stated:

$$\text{Gain} \times \text{input} = \text{output}$$

In this case, $$G(E-E_0)=E_0$$

or $$E/E_0 = 1 + 1/G$$

Therefore, if the gain is large, any voltage applied to E is very nearly equal to and balanced out by the output voltage developed across the resistor 26, and the true input voltage to the amplifier remains very nearly zero.

It may be noted here that the balancing out of the applied voltage is independent of the value of the gain as long as the latter is large. Distortion and instability of the amplifier therefore have only minute effects on the performance of the circuit.

A circuit essentially similar to this one has been described by Vance, Rev. Sci. Inst., 7, 489, (1936), for use as an electronic meter. For voltage measurement, a milliammeter is placed in the output circuit, and a precision resistor used to neutralize the input. The instrument is then almost wholly insensitive to line voltage fluctuation and drift in amplifier characteristics, and its accuracy is solely dependent on that of the meter and resistor, input voltages being calculated over a wide range by mere application of Ohm's law. For measurement of current, the instrument is shunted with another precision resistor. The current gain is then accurately the ratio of the two resistors, while in the case of the voltmeter application, the input resistance is simply that of the amplifier used, which may be nearly infinite.

The quantitative discussion of the performance of the circuit given above concerns only static equilibrium; it remains to be seen whether this is a stable or unstable equilibrium. The mathematical treatment of the dynamic performance of degenerative circuits has been fairly well developed, and is very complex, as described by Nyquist, Bell Syst. Tech. J., 11, 126 (1932). The results of the analysis, however, are fairly simple for the present circuit. It may have a stable or unstable equilibrium point; in the latter case it oscillates. Oscillation may be suppressed or eliminated entirely by the addition of the condenser of Figure 2, and when this is done, the stable equilibrium state is the same as the one reached by simple calculation of static conditions. The question of stability of the circuits of the present invention is an important one, and will be discussed at length later.

The matter of stability of the computing machine herein described has been investigated theoretically. The general condition for stability of feed-back circuits is derived by Nyquist, Bell Syst. Tech. J., 11, 126 (1932). Consider an amplifier of gain G provided with a feed-back network (in this instance the current supply) with gain B. The quantities G and B will in general be complex, because either or both the amplifier and the feed-back network may introduce phase shift, and they may vary with the frequency. If all possible values of the product G B and its conjugate (for all frequencies) are considered, it is found that the system will oscillate if the overall in-phase gain is unity. This gives definite specifications for the amplifiers used. The feed-back network (viz, current supply) is purely resistive so that B is a real number, and therefore the amplifiers must be so designed that their gain is less than 1/B for those frequencies at which the input and output are in phase. This is readily achieved by using high frequency by-pass filters in the input circuits of the amplifiers, and designing the amplifiers themselves for low response at high frequencies.

The factor B is also under control though it is inherently fixed by the coefficients controlling the resistors for a given system of equations. Its value is under control in that it depends on the order in which the equations are written and on the order of the variables in the equations. A convenient sufficient condition for stability (assuming that the amplifier meets the above mentioned requirement) is that B be negative. This condition is also very nearly necessary because it must be always less than 1/G when both B and G are real, and G is usually a large number. This reduces to the simple rule that a system of equations can give a stable solution in the machine if the matrix of the coefficients is such that all diagonal minors have the same sign. This rule concerns the stability of the machine once the solution has been attained. Nearly all systems of equations met in practice fulfill this condition or may be transformed to ones that do by writing them so that the largest coefficients lie on the diagonal of the matrix.

A more complete study involves also the dynamic manner in which the machine approaches the solution equilibrium state. This involves a solution of the general differential equations for the dynamic action of a machine for $n$ variables. The system of differential equations is linear and may be solved. The resulting criterion is that the machine will solve any system of equations for which the real parts of the roots of the characteristic equation of the matrix of coefficients are positive. Equations not satisfying this condition can always be transformed into ones that do satisfy it. See paper by W. V. Parker, on "The Limits to the characteristic roots of a matrix," Duke, Math. J., 10, 479–482 (1943). The transformation can usually be determined by inspection. Upon introducing such a system of equations into the machine one is assured of a stable solution.

The amplifiers used in the machine are necessarily of a rather special type. They must respond to a D. C. input of low voltage and supply an A. C. output. Linearity and distortion are wholly unimportant. Furthermore, they must show zero output when the input signal is positive, and a large gain as the signal goes slightly negative. Finally the drift of the zero point must be made very small. The current supplies may be regarded as parallel output stages of the amplifiers.

All this has been accomplished by the circuit given in Figure 7, which is a detailed circuit of an amplifier unit. The input stage is a resistance-coupled pentode 30 of the 6J7 type. The resistors here are chosen so that the voltage at the plate, with no signal on the input, is a constant fraction of the "B" supply.

The input circuit of the stage is provided with a switch 31, so that the machine may be operated according to Jacobi's method manually to be hereinafter described in detail in connection with the application of the present invention thereto. The large holding condenser 32 provides for a very large time constant when the circuit is open; a drift in output voltage of about 5% in 30 minutes was observed. The neon lamp 33 is a safety device, giving voltage breakdown when the machine is unbalanced, as when it is first turned on or when it is set for a system of dependent equations. This is necessary, because at extreme unbalance, the input voltage may rise to 900 volts and endanger the small condensers used.

The resistors 34 and 35 in the input line are required because when the grid of the tube 30 is more than about 2 volts positive, the tube amplifies without phase reversal, that is, a positive increment in the grid voltage gives a positive increment to that of the plate. Thus, the characteristic of the amplifier is a high plateau with a sharp crevasse at zero. Since this was unsatisfactory, and for purpose of correction the resistor was inserted to bring about a voltage drop when grid current flows. This phenomenon is believed to have occured because the positive grid, acting as an anode, collected so many electrons that the stream to the plate was actually impoverished, and the plate current decreased. This effect would occur in all tubes having a closely wound grid and low cathode emission. In the present circuit, the grid current is about 2 ma. when the grid is about 3 volts positive.

The output of the first stage is grounded to a fixed potential point through the triode 36 of the 6J5 type serving as an interrupter. This device merely converts the amplified D. C. to A. C., so that conventional A. C. coupling can be used between stages. The ground in this case is a point on a voltage divider 37 having a potential equal to the no-signal plate potential. If the pentode plate 38 goes more positive than this value, as it would with a negative signal, the interrupter which includes the triode 36, functions, and passes an A. C. signal on to the next stage which includes the tube 40' which is of the 6V6 type. When, however, the plate 38 goes negative, the rectifying action of the interrupter prevents any chopping of the signal, and the next stage does not respond.

The first stage and the interrupter voltage divider 37 form a bridge in which all the four arms are nearly ohmic resistances, and which is carefully balanced for no-signal operation. This balance is independent of line voltage fluctuations, so the amplifier presents a very stable zero point. One arm of the bridge is defined by the bottom portion of the resistance of the divider 37, the 30,000 ohm resistance 40; a second arm of the bridge is formed by the conductor 41, the 2000 ohm resistance 42, and the tube 30; a third arm of the bridge is formed by resistor 46; and the fourth arm is defined by the resistance 48 and the top portion of the resistance of the divider 37.

The second and last stage of amplification utilizes a conventional resistance-coupled beam tetrode 40', designed for slightly higher voltage gain and less power than usual.

Figure 8:
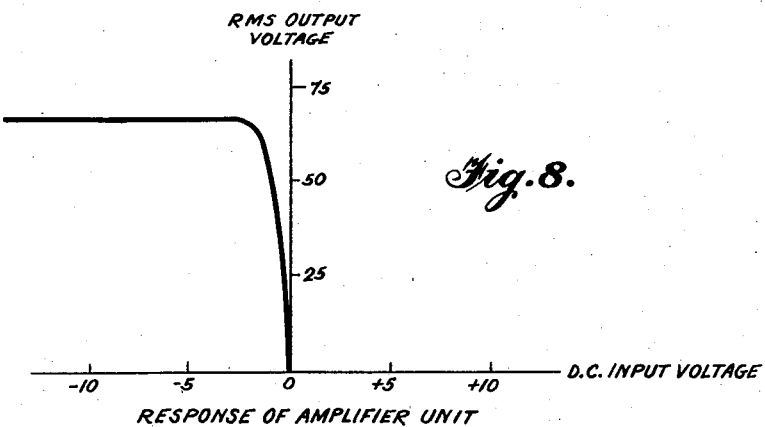
Figure 8 is a curve that has been plotted with root-mean square output voltage as ordinates and direct current input voltage as abscissae which illustrates the response of one of the amplifier units.

A typical response curve for one of these amplifiers is given in Figure 8. From a functional standpoint, the performances of the three units are identical.

Figure 9:
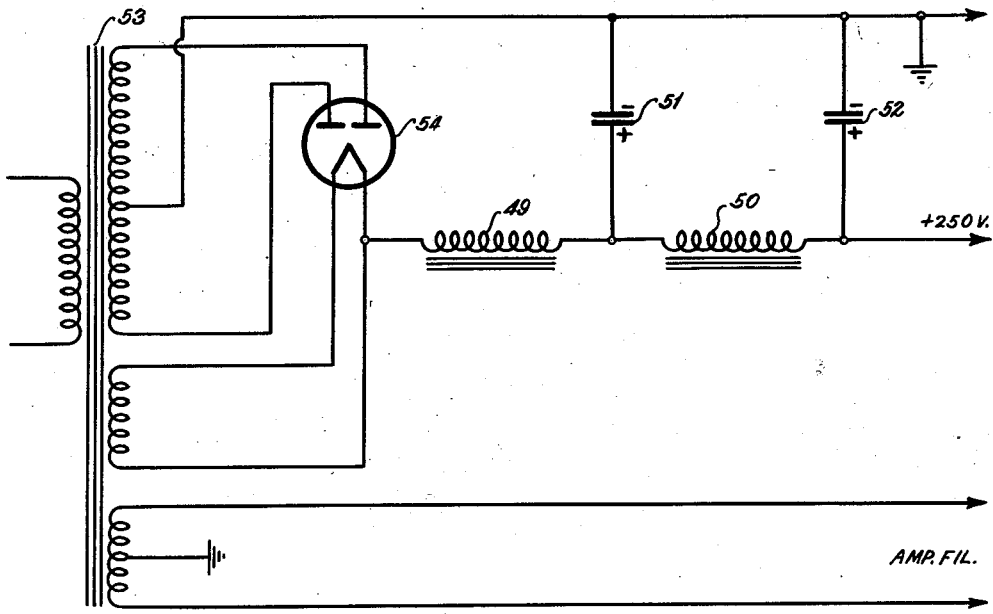
Figure 9 is a wiring diagram representing the power supply for the amplifiers.

The three amplifiers are operated from a common power supply shown in detail in Figure 9. Since this unit has no unusual features except that the filtering as provided by the network shown comprising the iron core inductances 49 and 50 and the condensers 51 and 52 is preferred for such circuits. This better than usual filtering is necessary because any ripple remaining will appear as A. C. output voltage from the amplifiers even when the input is positive, and this will reduce the effective range of the current supplies. In this figure the source of supply is shown as 110 volts A. C. and is impressed across the primary winding of a transformer 53 whose secondary is divided into a plurality of windings for supplying the amplifier filaments, the heater voltage for the rectifier tube 54, and the power supply to the rectifier tube.

In operation, to set the machine for a problem involving a system of simultaneous algebraic equations of $n$ variables, an $n$ element instrument is used. The $n^2$ coefficients are set by means of the variable resistors R illustrated in Figure 1 and the $n$ constant terms are set by means of the dividers S on directly calibrated dials. The roots of the equations are then read on the small meters such as those shown at F, G, and H, in the three-element machine illustrated in Figure 1, continuously and essentially instantaneously.

The instant invention is sufficiently flexible that it can be used for practicing Jacobi's method for the solution of systems of algebraic equations. Since the application of the instant invention to Jacobi's method will be described hereinafter, a brief description of his method will here be given:

Jacobi proposed a method similar to that of Gauss and Seidel and mathematically equivalent to it. In the use of his method, corrected values of the assumed roots are sought, rather than the explicit corrections. This method, however, has received little attention from calculators.

If one writes the given system of equations in the form $$a_{ij}x_j = k_i$$

Then assumed values are substituted for the $x$'s in the left side; a knowledge of the approximate values of the roots is of considerable help. The value of $x_1$ is now adjusted so that the first equation is satisfied; this is readily done, as it amounts merely to solving the first equation regarded as a single linear equation in one unknown. The value of $x_1$ so found is now substituted in all the equations, replacing the assumed value. Similarly, now, the second equation is solved for $x_2$, and the value so found substituted in all the equations. When this value is substituted in the first equation, that one will, in general, no longer be satisfied, but the second one will. The process is then continued through the $n$ variables, solving the $i$-th equation for $x_i$ in sequence, and substituting in the entire system the values found. When the process has been completed through the entire set of variables, the set of values in effect can be regarded as the first approximation to the roots comprising the solution. The entire process may then be repeated any number of times, obtaining a better approximation each time if the conditions for convergence are satisfied.

The convergence of the sequence of approximations so obtained has not been investigated rigorously, but undoubtedly could be along the lines disclosed by Schmidt in Phil. Mag., 32,369 (1941). However, Briant of the Mellon Institute, Pittsburgh, Pa., has demonstrated the simple sufficient condition $$a_{ii} > a_{jk} \qquad i, j, k, = 1, 2, \ldots n$$
$$j \neq k$$

Any system may be reduced to this canonical form by rearrangement of the sequence of the variables and equations, and by a few simple additions or subtractions of the equations.

The mechanism of operation of the machine of the instant invention can be made similar to the latter method. The value of the $q$-th variable is adjusted to satisfy the $q$-th equation. The difference, however, is that in Jacobi's method the adjustment is made on one variable at a time in turn, while the present device performs all adjustments simultaneously.

If the simultaneous adjustment of the variables does not lead to the correct solution, a slight alteration of the machine will permit it to function exactly as in Jacobi's method. All that is necessary is to provide the amplifier input lines with switches 31 as shown in Figures 1 and 7, and a large condenser to ground. Starting with all the switches open, they would then be closed momentarily one at a time in turn; a motor-driven commutator, not shown, could be used to do the switching automatically. At each closing of a switch one equation would be satisfied by adjustment of the variable in its diagonal term, and a new and better approximation would be obtained for each complete cycle of switching. Since the response of the amplifiers is nearly instantaneous, very rapid switching could be used and a high order approximation obtained in a fraction of a second. The machine would, thus, still give continuous indication. The commutator can be replaced with an electronic switching device, such as a special type of multivibrator circuit, so that the instrument would have no moving parts.

Figure 10:
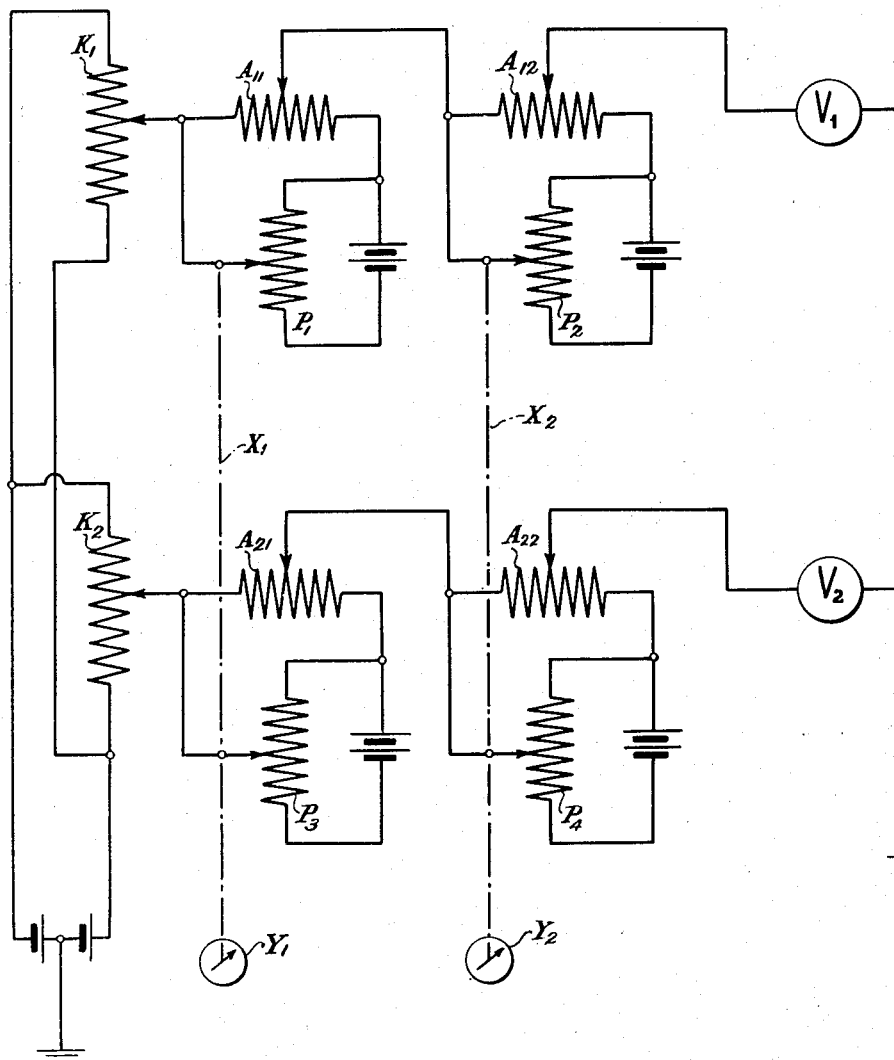
Figure 10 is a wiring diagram of a modified form of the invention.

A modification of the present invention that is adapted for use in solving systems of simultaneous equations by the Jacobi method is shown in Figure 10. Referring to the drawing for purpose of describing this form of the invention there is shown a circuit diagram for a two-element machine. Voltages proportional to the constant terms are supplied by the voltage dividers $K_1$ and $K_2$ respectively. The potentiometers $A_{11}$ and $A_{12}$ in one element, and $A_{21}$ and $A_{22}$ in the other element are adjusted to be proportional to the coefficients of the terms in the equations. Current supplies are provided connected across the resistances of the potentiometers $A_{11}$, $A_{12}$, $A_{21}$ and $A_{22}$. These currents are controlled by the setting of the potentiometers $P_1$, $P_2$, $P_3$ and $P_4$. Potentiometers $P_1$ and $P_3$ are ganged for simultaneous operation by mechanical linkage $X_1$. Potentiometers $P_2$ and $P_4$ are ganged for simultaneous operation by the mechanical linkage $X_2$. Indications $Y_1$ and $Y_2$ are provided for $X_1$ and $X_2$ respectively. The circuit of each element is connected to ground through voltmeters in the figure shown as $V_1$ and $V_2$.

In operation the potentiometers $K_1$ and $K_2$ are adjusted to provide voltages that are proportional to the constant terms of the equations and the potentiometers marked $A_{11}$ and $A_{12}$, and $A_{21}$ and $A_{22}$ are adjusted to be proportional to the coefficients of the variable terms of the equations. Then the control $X_1$ is adjusted until the first null indicator, the voltmeter $V_1$, indicates balance. Then the second control $X_2$ is adjusted to balance as indicated by the null indicator, voltmeter $V_2$. The process is then repeated several times until all of the null indicators can be made to register approximately zero simultaneously. When the equations are solved, that is, when the null indicators all register nearly zero, the roots may be read directly on the scales of the indicators $Y_1$ and $Y_2$.

This form of the invention, although manually operable, eliminates all vacuum tube amplifiers.

Although a three-element machine has been described in this application to illustrate, in part, the principles and operation of one form of the instant invention, and a two-element machine is shown to illustrate a second form of the invention, it is to be understood that this matter is not to be construed as limiting the invention to a machine for the solution of a system of three or less simultaneous equations, but the invention contemplates electronic calculating machines adapted for use in solving a system of simultaneous algebraic equations for any number of variables up to $n$ and machines may be built for any value of $n$.

The principle of employing fully degenerative feed-back for balancing electronic calculating machines in general as described above has broad application and it is to be understood that the applicant is not to be limited by the specific application of this principle as described above. As an additional example of the application of fully degenerative feed-back for balancing electronic calculating machines, it can be employed in machines for drawing integral solution curves, starting from any boundary point, of the general order of differential equations of the first order. Numerous other examples of the use of fully degenerative feed-back might be postulated. Broadly speaking, it provides the only convenient and general means for balancing an equation electrically; it is the electrical equivalent of the mathematician's equal sign. Since all of the usual elementary operations of mathematics can be performed electrically, it is possible to build a machine for solving any system of equations by using such negative feed-back.

The term transduced is here taken to mean a device accepting one or more signals and giving one or more signals as output, such that the output signal or signals is functionally dependent on the input one or ones and sometimes also on other controllable influences. A transducer, in this sense, is an extremely general device. Amplifiers, attenuators, phase shifters, the current supplies of the present machine and many other common circuits are to be considered as special cases of transducers. In the machine under consideration, the entire set of current supplies, with their resistors in series and their modulation in parallel sets may be regarded as the transducer. This definition of the term is an extension of the usual scientific one. The term is usually taken to mean any device for converting energy from one form to another, while in the present sense, although energy is converted, it is not conserved, and, since in most cases we will be concerned with the conversion of voltages, the energy absorbed from the input signals will be minute.

I claim:

1. An electronic calculating device for determining the roots of a system of simultaneous linear algebraic equations with $n$ variables where $n$ is any positive integer greater than unity, comprising in combination $n$ electronic amplifiers, $n$ D.-C. voltage sources adjustable to produce a voltage respectively proportional to the constant terms in the system of equations, and $n_2$ electrically regulatable current sources each supplying direct current to one of $n_2$ resistors adjustable to be respectively proportional to the coefficients of the system of equations, an electrical network involving the aforsesaid elements in such a way that one of said adjusted voltage sources and $n$ adjusted resistors corresponding to one equation and the input to one amplifier are in series and so that the current sources for said $n$ series-connected resistors are respectively connected to and regulated by a different one of said amplifiers, and current-responsive means in at least one of said current-supply circuits.

2. An electronic calculating device for determining the roots of a system of simultaneous linear algebraic equations with $n$ variables where $n$ is any positive integer greater than unity, comprising in combination $n$ electronic amplifiers each having a large shunt capacity and a series switch in its input circuit, $n$ D.-C. voltage sources adjustable to produce a voltage respectively proportional to the constant terms in the system of equations, and $n_2$ resistors adjustable to be respectively proportional to the coefficients of the system of equations, an electrical network involving the aforsesaid elements in such a way that one of said adjusted voltage sources and $n$ adjusted resistors corresponding to one equation and the input to one amplifier are in series and so that the current sources for said $n$ series-connected resistors are respectively connected to and regulated by a different one of said amplifiers, means for repeatedly successively momentarily closing said switches in each equation circuit until a substantially steady condition is attained, and current-responsive means in at least one of said current-supply circuits.

JOHN R. BOWMAN.

REFERENCES CITED

The following references are of record in the file of this patent:

UNITED STATES PATENTS

| Number | Name | Date |
|---|---|---|
| 1,799,134 | Hardy | Mar. 31, 1931 |
| 1,893,009 | Ward | Jan. 3, 1933 |
| 2,003,913 | Wente | June 4, 1935 |

OTHER REFERENCES

Vance, R. S. I., 7, 489, 1936.